United States Patent [19]

Chapman

[11] 4,171,186
[45] Oct. 16, 1979

[54] SUBMERGED PUMP CONTROL

[75] Inventor: Floyd A. Chapman, Portland, Oreg.

[73] Assignee: Hydronix, Inc., Portland, Oreg.

[21] Appl. No.: 824,169

[22] Filed: Aug. 12, 1977

[51] Int. Cl.² .................................. F04B 49/04
[52] U.S. Cl. ........................... 417/17; 73/322.5; 417/40
[58] Field of Search .............. 417/40, 41, 36, 17; 73/311, 318, 322.5

[56] References Cited

U.S. PATENT DOCUMENTS

| 2,488,506 | 11/1949 | Bernhardt | 417/38 X |
|---|---|---|---|
| 2,588,667 | 3/1952 | Stutzman | 73/322.5 X |
| 2,600,659 | 6/1952 | Koch, Jr. | 73/322.5 |
| 2,620,412 | 12/1952 | Ford | 417/40 X |
| 2,687,693 | 8/1954 | Hudson | 417/40 X |
| 2,697,196 | 12/1954 | Harper | 417/40 X |
| 2,748,220 | 5/1956 | Lung | 417/40 |
| 2,918,016 | 12/1959 | Olson | 417/36 X |
| 3,520,638 | 7/1970 | McUmber et al. | 417/36 |
| 3,545,272 | 12/1970 | McGill | 73/311 |

FOREIGN PATENT DOCUMENTS

| 1528472 | 7/1969 | Fed. Rep. of Germany | 417/40 |
|---|---|---|---|
| 586887 | 4/1947 | United Kingdom | 417/41 |

Primary Examiner—William L. Freeh
Assistant Examiner—Edward Look
Attorney, Agent, or Firm—Lee R. Schermerhorn

[57] ABSTRACT

A solenoid actuated mechanical relay is encapsulated in electrical insulating resin in a housing on a tubular column extending upward from a submerged pump unit in the bottom of a tank, to energize the pump motor. Float switches mounted on said housing are connected to the relay to control the pump in accordance with a liquid level in the tank.

1 Claim, 10 Drawing Figures

SUBMERGED PUMP CONTROL

BACKGROUND OF THE INVENTION

This invention relates to a submerged pump control for pumping liquid out of a tank under the control of a series of float switches.

Pump controls for this purpose heretofore have been relatively complicated and expensive because of the necessity of operation in submerged condition and have been subject to failure because of leakage of the tank liquid into the electrical control system. Such failures are particularly objectionable when the pump is in some remote location where its operation is not readily observable.

Objects of the present invention are therefore to provide an improved submerged pump control system, to provide a control system which is sealed liquid tight and to provide a system of the type described using a solenoid actuated mechanical relay and float switches to control the pump motor.

SUMMARY OF THE INVENTION

The present mechanism is applied to a submerged pump unit in the bottom of a tank. A solenoid actuated mechanical relay is encapsulated in electrical insulating resin in a housing on the upper end of a tubular column which is mounted at its base on the pump unit. Float switches mounted on said housing are connected to the relay to control the pump in accordance with a liquid level in the tank.

The invention will be better understood and additional objects and advantages will become apparent from the following description of the preferred embodiment illustrated in the accompanying drawings. Various changes may be made in the details of construction and arrangement of parts and certain features may be used without others. All such modifications within the scope of the appended claims are included in the invention.

DESCRIPTION OF THE PREFERRED EMBODIMENT

Figure 1:
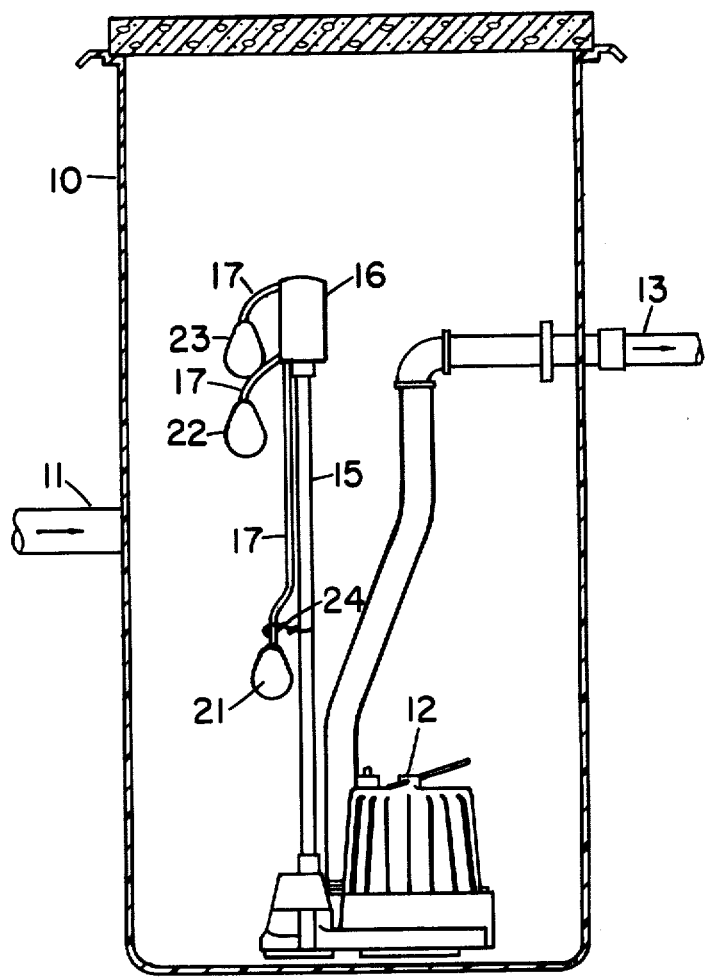
FIG. 1 is a vertical sectional view of a tank containing a pump unit embodying the present control system.

In FIG. 1, liquid flows into tank 10 from an inlet pipe 11. From time to time liquid is discharged from the tank by pump unit 12 through outlet pipe 13. The pump is driven by an electric motor which is sealed liquid tight to run in submerged condition and the motor is energized from a conventional electrical conduit (not shown) which is similarly sealed to prevent the entrance of liquid. Tank 10 may be buried in the ground in a location where the operation of the pump is not routinely observable, making reliability and durability of the pump and its control system of great importance.

The base end of a tubular column 15 is mounted on and sealed to the housing of pump unit 12 to convey circuit wires for the pump motor from a liquid tight relay housing 16 mounted with suitable sealing means on the upper end of the column. Similarly sealed in housing 16 are the upper ends of three flexible liquid tight tubes 17 containing circuit wires from a bottom float switch 21, middle float switch 22 and an upper float switch 23. Near its lower end the tube 17 for bottom float switch 21 is secured to column 15 by a wire tie 24 or other suitable fastening device.

Figure 2:
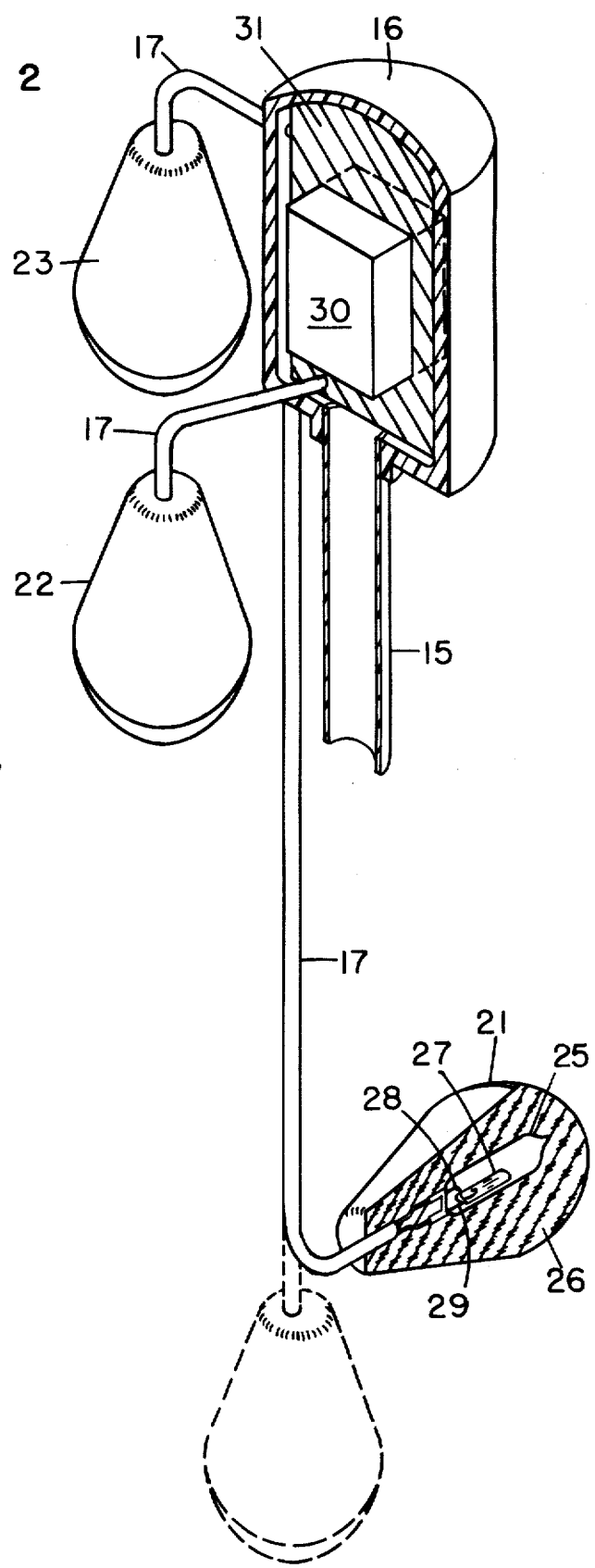
FIG. 2 is a perspective view with parts in section showing the float switches and relay housing.

The construction of float switch 21 is shown in FIG. 2. A mercury switch 25 is encapsulated in a body of bouyant plastic material 26. The mercury switch contains a globule of mercury 27 which is arranged to close a circuit through electrodes 28 and 29 when the bouyant plastic body 26 floats upward and to open said circuit when the plastic body hangs down. Thus, in FIG. 2 the solid line position of float switch 21 shows the switch in closed circuit condition while in the broken line position the switch is in open circuit condition. The lower end of tube 17 is sealed liquid tight in plastic material 26. Float switches 22 and 23 are of similar construction.

A solenoid actuated mechanical relay at 30 is enclosed in a container and encapsulated in suitable electrical insulating resin 31 in housing 16. Thus the components and circuit connectins for a control system for the motor in pump unit 12 are completely sealed against penetration by liquid in tank 10. The circuit wiring is omitted in FIG. 2 for clarity of illustration of the mechanical structure.

Figure 3:
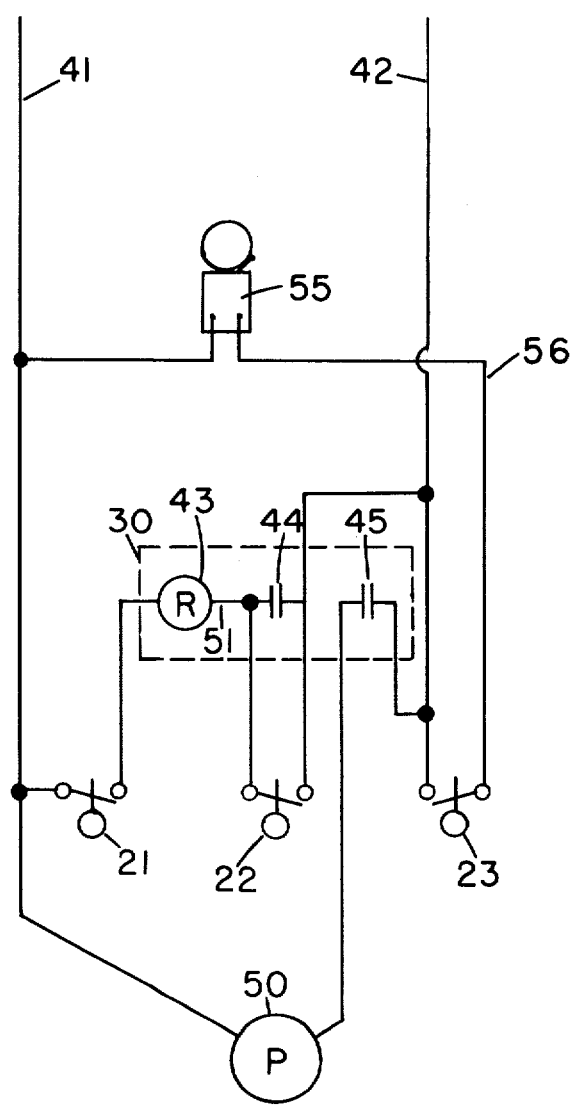
FIG. 3 is a wiring diagram of the control system.

Referring now to the wiring diagram in FIG. 3, the main power supply is represented by line wires 41 and 42. The relay 30 comprises a solenoid coil 43 and two pairs of contacts 44 and 45 which operate as a double pole single throw switch.

Line wire 41 is connected to solenoid coil 43 through float switch 21, this line wire also being connected to pump motor 50. A wire 51 connects the other terminal ofsolenoid coil 43 with one of the relay contacts 44 and one side of float switch 22. The other side of float switch 22 and the other contact 44 are connected to line wire 42. Relay contacts 45 are connected between pump motor 50 and line wire 42. A remote alarm device 55 is connected between line wire 41 and a wire 56 connected to one side of float switch 23. The other side of float switch 23 is connected to line wire 42.

Figure 4:
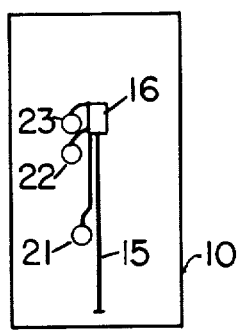
FIGS. 4–10 are a series of diagramatic sequence views illustrating the operation of the control system as the liquid level rises and falls within the tank.

The operation of the control system will be explained with reference to FIGS. 4–10. In FIG. 4 the tank is empty with the three float switches 21, 22 and 23 hanging down in open circuit position. Relay solenoid 43, pump motor 50 and alarm 55 are all de-energized.

Figure 5:
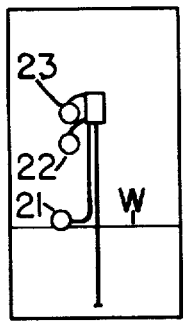
Figure 6:
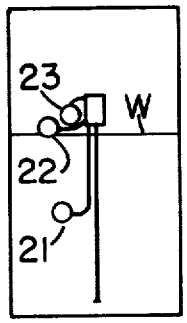

The rising water lever W in FIG. 5 has closed float switch 21 but this does not energize any part of the system. When the water lever rises to FIG. 6 position the closing of float switch 22 energized relay solenoid 43 to close the relay contacts 44 and 45, thus starting the pump motor 50.

Figure 7:
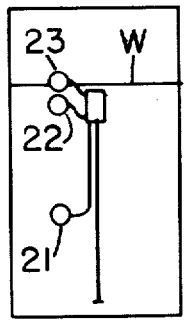

If liquid is flowing into the tank faster than the pump can pump it out, the liquid level will rise still further as indicated in FIG. 7, closing float switch 23. This sounds the alarm 55 giving warning that the pump cannot keep up with the inflow. The tank 10 has a reserve capacity above float switch 23 to hold a brief surge of inflow but if alarm 55 continues to sound for an extended interval of time, that is a warning that the tank may be overflowing.

Figure 8:
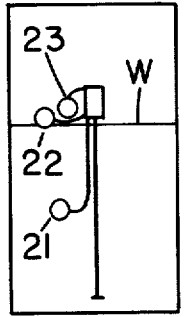
Figure 9:
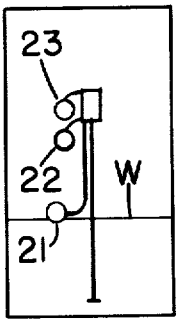

After the inflow surge has passed, the liquid level drops to the position in FIG. 8 opening float switch 23 and turning off the alarm 55. Then, as the liquid level drops from its FIG. 8 position to its FIG. 9 position, float switch 22 opens without producing any change in the circuit. Relay solenoid 43 remains energized through closed float switch 21 and closed relay contacts 44, and pump motor 50 remains energized through closed relay contacts 45.

Figure 10:
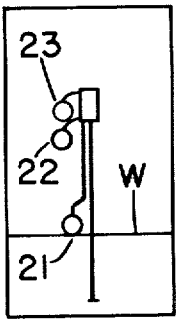

The pump is not stopped until the liquid level reaches the FIG. 10 position causing float switch 21 to open. The opening of switch 21 de-energizes solenoid coil 43 resulting in the opening of relay contacts 44 and 45. The latter open the circuit to pump motor 50.

Thus, when the rate of inflow through pipe 11 is small in relation to the capacity of the pump, the pump is not required to start and stop repeatedly at brief intervals. Under such conditions pump operation is delayed until the liquid level rises to its FIG. 6 position and then the pump operates continuously until the liquid has been pumped down to the level in FIG. 10, thereby reducing wear and tear on the pump and relay prolonging the life of the apparatus.

What is claimed is:

1. An electric motor driven pump unit for use in the bottom of a tank, comprising a tubular column connected at its lower end to said unit, a housing on the upper end of said column containing a solenoid actuated mechanical relay for energizing said motor, said relay being encapsulated in electrical insulating resin in said housing, top and middle floats each connected to said housing by a short flexible tube, a bottom float connected to said housing by a long flexible tube, the lower end of said long tube being connected to said column, a mercury switch encapsulated in each of said floats, and an alarm, the switch in said middle float being connected to said relay to start said pump in response to the rising of said middle float, the switch in said top float being connected to said alarm to actuate the alarm in response to the rising of the top float and turn off the alarm in response to the lowering of the top float, and the switch in said bottom float being connected to said relay to stop said pump in response to the lowering of said bottom float.

* * * * *